(No Model.) 2 Sheets—Sheet 1.

J. F. BROWN.
EXTENSION GAS FIXTURE.

No. 268,999. Patented Dec. 12, 1882.

Witnesses.
Frank S. Waterbury
J. R. Torrat

Inventor.
John F. Brown

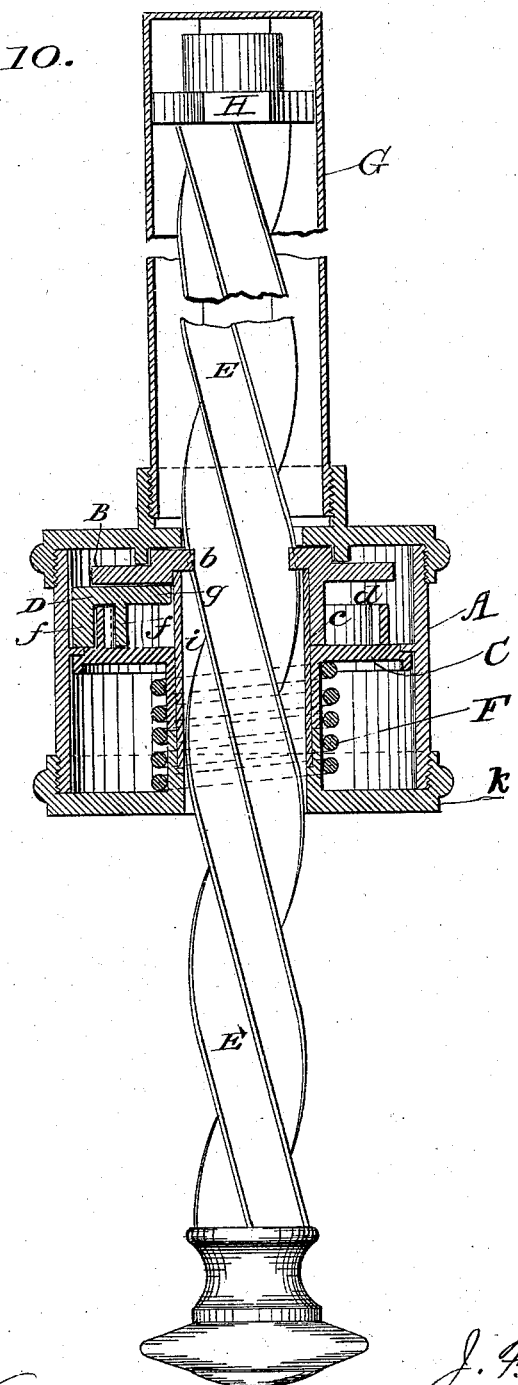

UNITED STATES PATENT OFFICE.

JOHN F. BROWN, OF BROOKLYN, ASSIGNOR TO CHARLES F. OXLEY AND SILAS M. GIDDINGS, OF NEW YORK, N. Y.

EXTENSION GAS-FIXTURE.

SPECIFICATION forming part of Letters Patent No. 268,999, dated December 12, 1882.

Application filed June 14, 1882. (No model.)

*To all whom it may concern:*

Be it known that I, JOHN F. BROWN, of Brooklyn, Kings county, New York, have invented a new and useful Improvement in Extension Gas-Fixtures, to be used in connection with the invention and device secured to me by Letters Patent No. 256,426, dated April 11, 1882, being a clamp for extension gas-fixtures; and the following is a full, clear, and exact description of such improvement, reference being hereby made to said patent of April 11, 1882, for a description of the said invention to which the above improvement applies, and to the accompanying drawings, the first six figures of which relate to said original invention.

My present improvement is a device to increase the friction in the downward movement of the rod through case A, as shown in said patent, and so that such friction shall be sufficient to hold the gas-fixture in place when brought to the desired position.

The accompanying drawings show the device patented in the patent of April 11, 1882, and also the manner in which my present improvement is applied in connection with said device.

Figure 1:
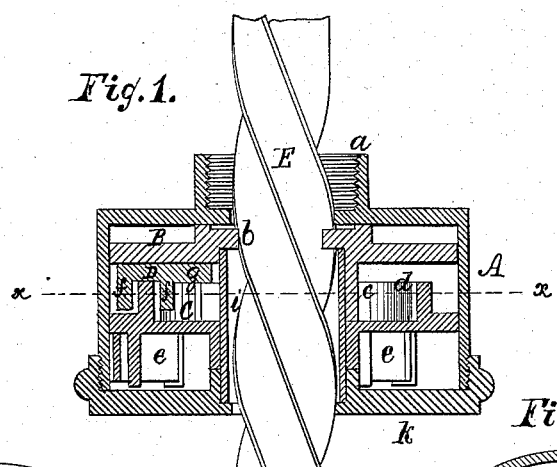
Figure 2:
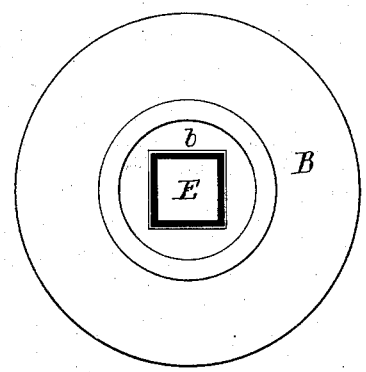
Figure 3:
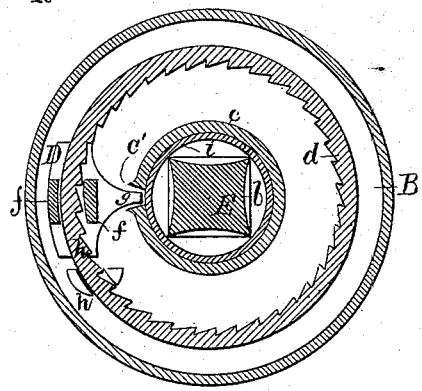
Figure 6:
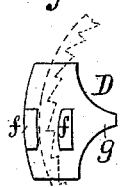
Figure 4:
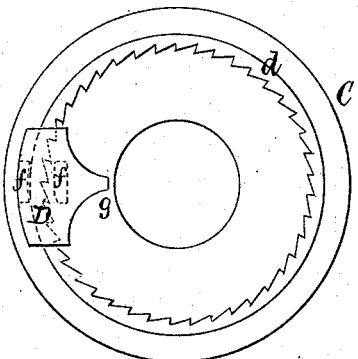
Figure 7:
Figures 8, 9:

Reference is to be had to the said drawings, which form part of this specification, in which similar letters of reference indicate corresponding parts in all the figures, the first six figures relating to the original patent, and in which *a* indicates a screw-collar; *b*, a central aperture in disk B; *c*, a hub; *c'*, a slot; *d*, annular flange; *e e e*, spring-arms; *k*, bottom cap; *f f*, lugs; *g*, side lug, as in my patent above referred to. Figure 3 is on the line *x x* of Fig. 1. Fig. 7 is a hollow twisted rod with a nut brazed at the top. Fig. 8 is a spiral spring. Fig. 9 is a tube having corresponding angles to the brazed nut, and Fig. 10 shows the proper relations and combinations of the parts claimed.

The spiral spring is used in combination with my former invention for increasing the friction to hold the drop-light in place. This spring F may be, so far as the wire constituting the same is concerned, either round or angular, or indeed of any desired shape or form which does not lessen the elasticity of the spring. It is designed to be set compactly between the bottom of case A and the disk C when the parts are closely screwed together. Case A, when my improvement is used, must be constructed with an interior collar or flange about midway between the bottom and top of the case, against which the disk C is pressed by the spring F. This spiral spring is designed to increase the friction in the case A in the downward movement of the rod E.

Figure 5:
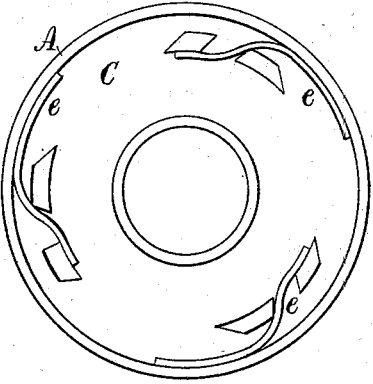

With the use of the spiral spring F the spring-arms *e e e* in Fig. 5 may or may not be used. The slide-rod E, passing through the case A, has a six-sided nut brazed or secured on the top, which fits into a six-sided tube, G, and prevents the hollow rod E from turning, so that when the rod E is pushed up the friction is relieved in the box, whereby the twisted rod E moves upward freely; but when this rod is pulled downward the spring F acts directly on disk C, and the friction caused by the action of the dog D against the rough side or ratchet-teeth of disk C and on the surface of said disk C is increased, and thus sustains the weight of the fixture on the rod E at any point within the length thereof.

The hollow rod E is designed to have attached thereto on its upper end an angular nut, H, brazed or secured and fitting within a tube, G, of corresponding angles, either square, sextangular, or any other angular form of nut which would prevent the turning of the rod E in the tube G; or said tube G may be round and have a longitudinal slot on two or more sides thereof, into which a nut, pin, or plate shall be constructed, so as to fit compactly into the said slots and fill the tube G.

What I claim, and desire to secure by Letters Patent, is—

In clamps for drop-lights, the friction-spring F, in combination with the disks B and C, the dog D, the tube *i*, the rod E, the tube G, the nut H, and the case A, with interior collar, substantially as shown and described.

JOHN F. BROWN.

Witnesses:
P. R. FORREST,
HIRAM JONES.